United States Patent [19]
Jones et al.

[11] Patent Number: 5,491,547
[45] Date of Patent: Feb. 13, 1996

[54] METHOD AND APPARATUS FOR INHIBITING LASER DETECTION

[75] Inventors: Mark F. Jones; Henry Devilliers, both of San Antonio, Tex.

[73] Assignee: Laser Stealth Technology L.L.C., San Antonio, Tex.

[21] Appl. No.: 253,806

[22] Filed: Jun. 3, 1994

[51] Int. Cl.$^6$ .............................. G09F 7/00; G01P 3/36
[52] U.S. Cl. .............................. 356/28; 342/13; 40/202; 250/341.1
[58] Field of Search ................. 342/13, 14; 356/28; 40/200–205; 250/341

[56] References Cited

U.S. PATENT DOCUMENTS

| | | | |
|---|---|---|---|
| 4,457,089 | 7/1984 | Phillips, Jr. | 40/204 |
| 5,056,817 | 10/1991 | Fuller | 280/770 |
| 5,150,960 | 9/1992 | Redick | 362/83.2 |
| 5,177,889 | 1/1993 | Ching Hwei | 40/204 |
| 5,381,618 | 1/1995 | Singleton | 40/202 |

OTHER PUBLICATIONS

Road and Track Magazine, Dec. 1992, p. 137.
Road and Track Magazine, Nov. 1993, p. 127.

*Primary Examiner*—Mark Hellner
*Attorney, Agent, or Firm*—Gunn, Lee & Miller

[57] ABSTRACT

Applicant's invention is a method and apparatus for inhibiting laser detection wherein the infrared laser light from a laser gun is absorbed, diffused, and dispersed, hindering the quick response needed for accurate laser readings. The laser detection inhibitor incorporates a rectangular acrylic lens panel and a filtering treatment which coats or is infused into the acrylic lens panel. The acrylic lens panel is suitably formed for placement over a vehicular license plate. The panel is adapted for placement over the license plate. After the panel is sprayed or infused during molding with the filtering treatment, the panel is affixed over the license plate using the existing attachment means for the vehicular license plate. Applicant's invention uniformly covers the license plate absorbing, diffusing, and dispersing infrared laser light and therefore, inhibiting laser detection.

17 Claims, 2 Drawing Sheets

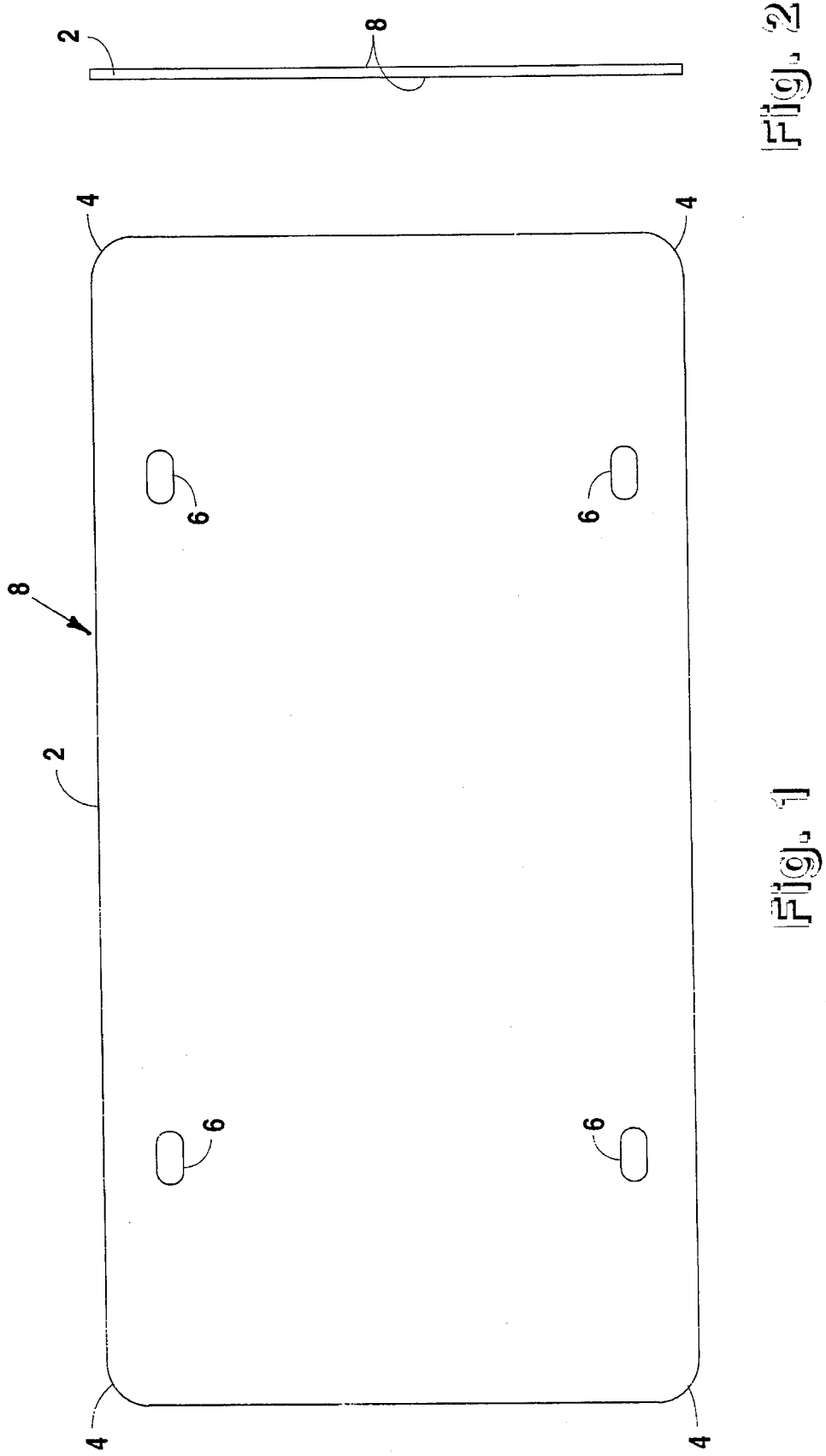

METHOD AND APPARATUS FOR INHIBITING LASER DETECTION

BACKGROUND OF THE INVENTION

1. Field of the Invention

This invention generally relates to laser stealth technology, more specifically to an acrylic lens panel coated or infused with a filtering treatment for the absorption, diffusion, and dispersion of infrared laser light.

2. Background Information

The speed detection industry has evolved significantly over the past several years, beginning with the conventional radar gun and countermeasure radar detector progressing to the newer laser gun and more recent laser detector.

In the current art, conventional radar guns use the "first car" theory. Radar's wide beam allows operation of the radar gun from a moving or stationary vehicle. Target identification, however, is normally limited to the first car. This conventional radar emits microwave signals, detectable beyond line of sight by radar detection devices. This phenomenon allows radar detection devices to be an adequate countermeasure.

With the advancement of technology, however, has come the use and development of laser technology for speed detection. Laser technology in speed detection incorporates the lidar gun which uses a narrow beam from a stationary position. Laser operates on the parallax theory of two straight lines. Target identification is possible through sighting the beam on any vehicle within the operator's line of sight.

Visible light begins at approximately 400 namometers and ends at approximately 700 namometers. The lidar gun emits a laser frequency in the near infrared wavelength, the most common center frequency being approximately 905 namometers. The laser gun emits a short pulse of IR energy in a circular, narrow beam which is pointed at a vehicle's license plate because of the license plate's reflective properties. The distance to a target is then measured approximately 400 times per second.

Laser detection devices alone provide little or no advance warning while used in a lead vehicle. Most laser detection units alert you to laser only at the moment after the lidar gun has locked onto the auto's speed. Furthermore, many laser detection units, when tested, remained mute when the auto was locked into through a lidar gun from the rear of the vehicle.

Because a laser gun must "see" its' returning pulses, there has been experimentation in reducing the reflectivity of the auto. To date, strides in such experimentation were made only at the expense of the vehicle's function and appearance.

This young market has also attracted laser jamming products which do not fit the guidelines of conventional marketing prerequisites. Although many of these products have been tested with some success, they are not recommended due to price, legality, and general inconvenience.

There has also been experimentation and testing of actions and devices related to "flooding" the laser guns with large doses of infrared light. Current devices mount on the exterior of the vehicle near the vehicle's license plate such that when the laser gun is fired at the plate, the beam is flooded with infrared light, inhibiting reflection of the laser beam. These devices have met with limited success, primarily because they lack the sturdiness needed for mounting the device on the exterior of the vehicle.

Testing has also included turning a vehicle's driving lights on high, decreasing the reflective properties of the automobile. With the driving and bright lights illuminated, there was a significant decrease in the range and therefore the effectiveness of the lidar gun. Occasionally, however, the lidar gun was successful in locking into a speed even though an extensive amount of light was directed toward the gun. This method of inhibiting laser detection is not highly recommended however due to safety factors as drivers would be inclined to blind other drivers with high levels of light.

The physics of the laser gun demands different type countermeasures than those traditionally used for the radar gun. Applicant's invention addresses the need for an effective laser gun countermeasure without the negative side effects mentioned above. Applicant's invention was designed to eliminate the reflectivity of the vehicle license plate, thus reducing laser speed gun range. This method, used with a detector acts as a guard against laser speed measurement. The ability of Applicant's laser inhibitor to challenge the range of the laser gun makes Applicant's invention a solid countermeasure.

SUMMARY OF THE INVENTION

The present invention encompasses a method and apparatus for inhibiting laser detection. Applicant's laser detection inhibitor comprises a rectangular acrylic lens panel which is cut from a larger acrylic sheet or molded from acrylic. A filtering treatment coats or is infused into the acrylic lens panel and in combination with the initial acrylic lens panel successfully absorbs, diffuses, and disperses infrared laser light. This, in turn, hinders the quick response needed for accurate laser readings producing an "uncooperative target." Applicant's method of inhibiting laser detection begins with forming an acrylic lens panel suitable for placement over a vehicular license plate. This acrylic lens panel is adapted for placement over a vehicular license plate and is coated, through spraying, or infused with a filtering treatment. After the acrylic lens panel is sprayed or infused with the filtering treatment, the panel is affixed over the vehicular license plate, the acrylic lens panel generally corresponding with the configuration of the license plate.

It is an object of Applicant's invention to provide a laser inhibitor which, by incorporating an acrylic panel having a filtering treatment, hinders the quick response needed for accurate readings from a laser gun.

It is an also an object of Applicant's invention to provide a laser inhibitor which, through placement against a vehicle's license plate, produces an uncooperative target for laser detection.

Another object of Applicant's invention is to provide a laser inhibitor which absorbs, diffuses, and disperses infrared laser light.

Another object of Applicant's invention is to provide a laser inhibitor which prevents adequate signal reflection back to a laser gun with only a minimal reduction in the visible spectrum.

Other purposes and advantages will become apparent from the following description in light of the attached drawings.

BRIEF DESCRIPTION OF THE DRAWINGS

FIG. 1 is a front view of the acrylic lens panel as shown coated or infused with a filtering treatment.

FIG. 2 is a side view of Applicant's laser plate as shown coated or infused with a filtering treatment.

DETAILED DESCRIPTION OF THE PREFERRED EMBODIMENT

Figure 4:
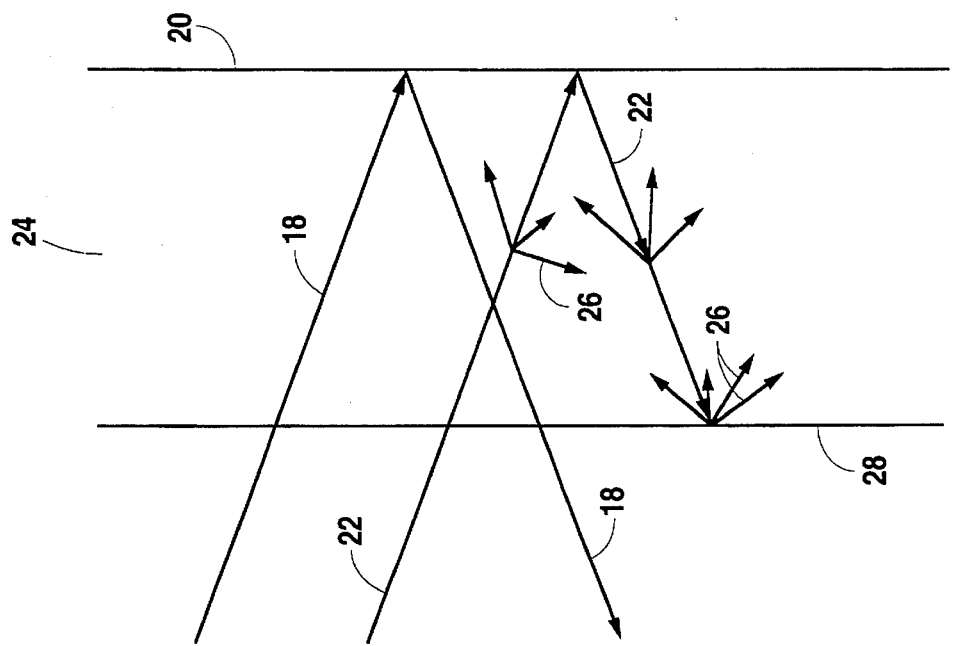
FIG. 4 illustrates the normal path of infrared light as well as the path of infrared light when subjected to Applicant's acrylic lens panel infused during molding with a filtering treatment, the infrared light being absorbed, dispersed, and diffused.

Referring to FIG. 1, Applicant's invention is shown in front view, the rear view being a mirror image of the front view as shown. A rectangular acrylic lens panel (2) has been cut from a larger acrylic sheet or has been formed through molding with acrylic. The rectangular acrylic lens panel (2) has four rounded corners (4) and four apertures (6). The rounded corners (4) and apertures allow the acrylic lens panel (2) to be placed over the vehicular license plate such that the acrylic lens panel (2) generally corresponds with the configuration of the vehicular license plate. The apertures (6) are appropriate for receiving the existing attachment means for the vehicular license plate, alleviating the need for a new attachment means. The acrylic lens panel (2) is a durable, flexible, clear acrylic that is shatter resistant, lightweight, and suitable for exposure to exterior elements.

The acrylic lens panel (2) is coated or infused during molding with a filtering treatment (8) that absorbs, diffuses, and disperses infrared laser light. Therefore, reflection of laser light off of the auto's license plate is inhibited preventing an adequate signal analysis within the laser gun's system.

A laser radar beam generally possesses a circular, narrow beam configuration emission. The laser gun is typically pointed at the license plate of the vehicle due to the license plate's reflective factors. The filtering treatment (8) which coats or has been infused into the acrylic lens panel (2) inhibits a significant amount of this laser beam, preventing adequate reflection off of the license plate and ultimately an adequate signal analysis. The elements of the filtering treatment, discussed further below, also render the acrylic lens panel itself non-reflective.

The preferred embodiment of the filtering treatment (8) consisting of wood resins, matting agents, adhesive agents, and a lacquer base, was originally designed for application over articles sensitive to ultra violet rays or halogen lights. This filtering treatment protects the article(s) from ultra violet rays emitted from the sun or commonly used halogen lights. Halogen lights emit approximately 40–50% of their radiation in the infrared (above 700 nanometers) wavelength spectrum. Consequently, the coating also possesses protective agents that perform and assist in protecting the article(s) from infrared light while allowing the observer to clearly view the article with the naked eye (commonly referred to as the visible spectrum). The same principle and concept is applied through Applicant's invention.

The acrylic lens panel (2) is completely coated or is infused during molding with the filtering treatment (8) for optimum performance. Although the filtering treatment (8) physically alters the surface or composition of the acrylic lens panel (2), Applicant's invention appears clear when placed close to a vehicular license plate such that the license plate can be easily seen. Applicant's invention effects both visible and infrared light as well as coherent and non-coherent light while still allowing the observer to view through the filtering treatment (8) with the naked eye.

When the naked eye observes an object, the eye reacts like an optic using visible light reflected off of an object to interpret that object. Applicant's invention, therefore, accomplishes the stated desired performance through inhibiting reflection of infrared light while still allowing enough visible light reflection to pass through the plate for the license plate to be easily viewed by the naked eye. Therefore, Applicant's invention may also be placed, if modified in shape or form, over other reflective vehicular parts.

Referring now to FIG. 2, Applicant's invention is shown in side view. Applicant's invention consists of the acrylic lens panel (2) and filtering treatment (8), the filtering treatment (8) either coating the acrylic lens panel (2) or infused during molding with acrylic to form the acrylic lens panel (2), and for best performance is ⅛" in thickness.

Figure 3:
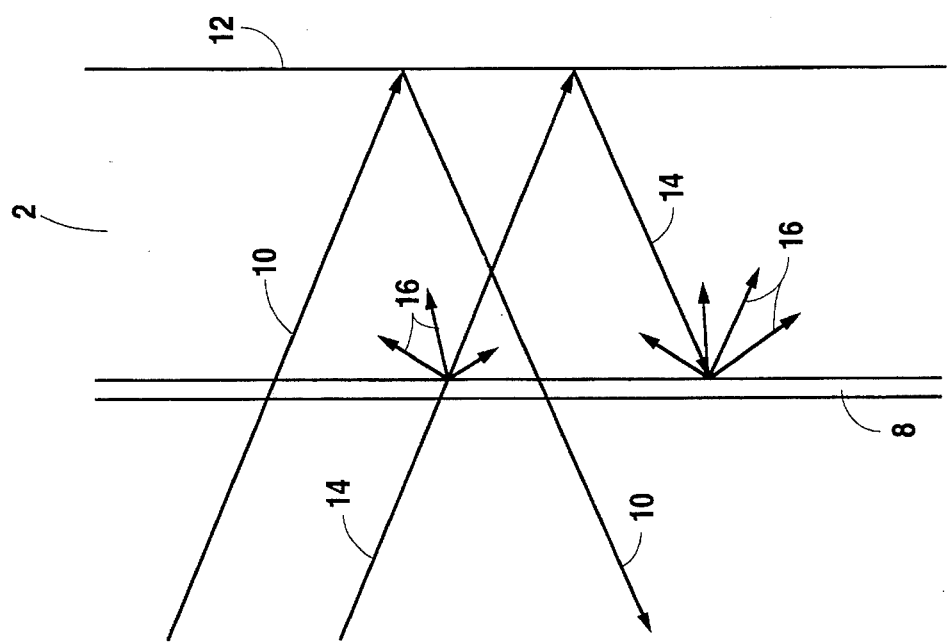
FIG. 3 illustrates the normal path of infrared light as well as the path of infrared light when subjected to Applicant's acrylic lens panel coated with a filtering treatment, the infrared light being absorbed, dispersed, and diffused.

FIG. 3 illustrates the path of infrared light during normal reflection as well as when exposed to Applicant's acrylic lens panel coated with a filtering treatment. Path A (10) illustrates the general path of infrared light as it reflects off a vehicular license plate (12). Path B (14), however, illustrates the path of infrared light when exposed to Applicant's laser detection inhibitor, particularly the filtering treatment (8) coating the acrylic lens panel (2). The filtering treatment (8) absorbs, diffuses, and disperses the infrared laser light (16). In addition, the filtering treatment physically alters the surface of the acrylic lens panel such that the surface of the acrylic lens panel is also non-reflective. Therefore, a significant amount of laser light is prevented from reflecting off the license plate (12) and returning to the laser unit for adequate signal analysis.

FIG. 4 illustrates the path of infrared light during normal reflection and when exposed to Applicant's acrylic lens panel infused with a filtering treatment during molding. Path C (18) as Path A (10) in FIG. 3, illustrates the general path of infrared light as it reflects off a vehicular license plate (20). Path D (22), however, illustrates the path of infrared light when exposed to Applicant's acrylic lens panel (28) infused with a filtering treatment (24) during molding. The filtering treatment (24) absorbs, diffuses, and disperses the infrared laser light (26) as the infrared light travels through the acrylic lens panel (28) to as well as away from the vehicular license plate (20). The filtering treatment, when infused into the acrylic used to mold the acrylic lens panel, alters the composition of the acrylic such that the surface of the acrylic lens panel (28) is non-reflective. As with Applicant's invention illustrated in FIG. 3, a significant amount of laser light is prevented from reflecting off the license plate (20) and returning to the laser unit for adequate signal analysis.

If a laser beam returns with uniformity and without distortion of it's signal as shown in Path A (10), performance of the laser gun is normally successful. Applicant's invention, however, disrupts the needed signal response thereby affecting the range of the laser unit. It follows that if a laser system normally detects a speed at 1500 feet away, use of Applicant's invention will significantly reduce the response distance of the laser system for the same vehicle.

Applicant's method of inhibiting laser detection comprises the first step of forming or molding a rectangular lens panel. The acrylic lens panel, if formed from a larger acrylic sheet, is measured for placement over a vehicular license plate such that when cut into a rectangular form (having four corners), the acrylic lens panel generally corresponds with the configuration of the vehicular license plate. If the acrylic lens panel is molded from acrylic and a filtering treatment, the mold generally corresponds with the configuration of the vehicular license plate. The acrylic lens panel is then adapted for affixation to a vehicle's license plate through creating apertures appropriate for receiving the existing attachment means for the license plate and configuring the corners, if needed, to correspond with the configuration of the license plate.

The acrylic lens panel is coated, through spraying, with a filtering treatment provided the acrylic lens panel was not originally molded with the filtering treatment infused within the acrylic. The filtering treatment, if sprayed over the acrylic lens panel, physically alters the surface of the acrylic lens panel such that the surface of the acrylic lens panel is non-reflective. If the acrylic lens panel was originally molded from acrylic infused with the filtering treatment, the filtering treatment alters the composition of the acrylic lens panel such that the surface of the acrylic lens panel is non-reflective. Applicant's invention, including the acrylic lens panel and filtering treatment, is then affixed over a vehicle's license plate using the existing attachment means for the vehicular license plate. Applicant's invention uniformly covers the license plate absorbing, diffusing, and dispersing infrared laser light and therefore, inhibiting laser detection.

What is claimed is:

1. Method of inhibiting laser detection comprising the steps of:
   a. altering light transmission properties of an acrylic lens panel, said acrylic lens panel suitable for placement over a vehicular license plate wherein altering light transmission properties of said acrylic lens panel comprises the steps of:
      i. forming said acrylic lens panel;
      ii. adapting said acrylic lens panel for placement over said vehicular license plate;
      iii. coating said acrylic lens panel with a filtering treatment.

2. Method of inhibiting laser detection as recited in claim 1 further comprising the step of:
   d. affixing said acrylic lens panel over said vehicular license plate.

3. Method of inhibiting laser detection as recited in claim 2 wherein forming said acrylic lens panel comprises the steps of:
   a. measuring said acrylic lens panel for placement of said acrylic lens panel over said vehicular license plate; and
   b. cutting said acrylic lens panel into a rectangular form having four corners, said acrylic lens panel generally corresponding with a configuration of said vehicular license plate.

4. Method of inhibiting laser detection comprising the steps of:
   a. altering light transmission properties of an acrylic lens panel, said acrylic lens panel suitable for placement over a vehicular license plate, wherein altering light transmission properties of said acrylic lens panel comprises the steps of:
      i. molding said acrylic lens panel comprising the step of infusing a filtering treatment into acrylic used to mold said acrylic lens panel wherein infusing said filtering treatment into said acrylic comprises physically altering the composition of said acrylic such that the surface of said acrylic lens panel is non-reflective;
      ii. adapting said acrylic lens panel for placement over said vehicular license plate; and
      iii. affixing said acrylic lens panel over said vehicular license plate.

5. Method of inhibiting laser detection as recited in claim 2 wherein adapting said acrylic lens panel for affixation to said vehicular license plate comprises the steps of:
   a. creating apertures appropriate for receiving existing attachment means for said vehicular license plate; and
   b. configuring said corners of said acrylic lens panel to correspond with said configuration of said vehicular license plate.

6. Method of inhibiting laser detection as recited in claim 5 wherein affixing said acrylic lens panel to said vehicular license plate comprises the steps of:
   a. using said existing attachment means for said vehicular license plate to affix said acrylic lens panel over said vehicular license plate.

7. Method of inhibiting laser detection as recited in claim 6 wherein coating said acrylic lens panel with said filtering treatment comprises the steps of:
   a. spraying said acrylic lens panel with said filtering overlay treatment wherein spraying said acrylic lens panel comprises physically altering the surface of said acrylic lens panel such that said surface of said acrylic lens panel is non reflective.

8. A laser detection inhibitor suitable for placement over a vehicular license plate, comprising:
   a. a rectangular acrylic lens panel, said acrylic lens panel having four corners; and
   b. a filtering treatment, said filtering treatment coating said rectangular acrylic lens panel wherein said filtering overlay treatment absorbs, disperses, and diffuses infrared laser light.

9. A laser detection inhibitor suitable for placement over a vehicular license plate, comprising:
   a. a rectangular acrylic lens panel, said acrylic lens panel having four corners; and
   b. a filtering treatment, said filtering treatment infused into acrylic used for said acrylic lens panel wherein said filtering treatment absorbs, disperses, and diffuses infrared laser light.

10. A laser detection inhibitor suitable for placement over a vehicular license plate as recited in claim 8, wherein:
    said rectangular acrylic lens panel includes at least one aperture, said aperture appropriate for receiving existing attachment means for said vehicular license plate.

11. A laser detection inhibitor suitable for placement over a vehicular license plate as recited in claim 9, wherein:
    said rectangular acrylic lens panel includes at least one aperture, said aperture appropriate for receiving existing attachment means for said vehicular license plate.

12. A laser detection inhibitor suitable for placement over a vehicular license plate as recited in claim 8, wherein:
    said rectangular acrylic lens panel includes four apertures, said apertures appropriate for receiving existing attachment means for said vehicular license plate.

13. A laser detection inhibitor suitable for placement over a vehicular license plate as recited in claim 9, wherein:

said rectangular acrylic lens panel includes four apertures, said apertures appropriate for receiving existing attachment means for said vehicular license plate.

14. A laser detection inhibitor suitable for placement over a vehicular license plate as recited in claim 10, wherein:

said corners of said rectangular acrylic lens panel are configured to correspond with a configuration of said vehicular license plate.

15. A laser detection inhibitor suitable for placement over a vehicular license plate as recited in claim 11, wherein:

said corners of said rectangular acrylic lens panel are configured to correspond with a configuration of said vehicular license plate.

16. A laser detection inhibitor suitable for placement over a vehicular license plate as recited in claim 14, wherein:

said filtering treatment physically alters the surface of said acrylic lens panel such that said surface of said acrylic lens panel is non reflective.

17. A laser detection inhibitor suitable for placement over a vehicular license plate as recited in claim 15, wherein:

said filtering treatment physically alters the composition of said acrylic used to mold said acrylic lens panel such that the surface of said acrylic lens panel is non-reflective.

\* \* \* \* \*